Jan. 14, 1947.  H. C. SCHROEDER  2,414,335
BALL BEARING ASSEMBLY
Filed Jan. 19, 1945
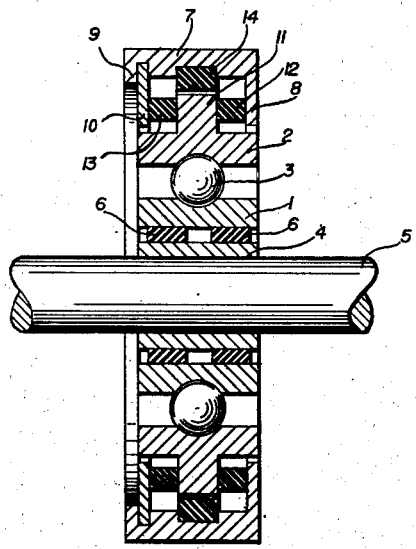
INVENTOR.
HERMAN C. SCHROEDER
BY
ATTORNEY Patented Jan. 14, 1947

2,414,335

UNITED STATES PATENT OFFICE 2,414,335

BALL-BEARING ASSEMBLY

Herman C. Schroeder, Parma, Ohio, assignor, by mesne assignments, to Jack & Heintz Precision Industries, Inc., Cleveland, Ohio, a corporation of Delaware Application January 19, 1945, Serial No. 573,561

6 Claims. (Cl. 308—184)

This invention relates in general to bearing units and more particularly to the general type in which rubber or other resilient material is incorporated in the unit for the purpose of absorbing shock and vibration.

The primary object of the invention is to provide a self-contained bearing unit which is inherently shock absorbing and in which positive provision is made for maximum efficiency in absorption of shock and vibration in shear as well as in compression.

With the foregoing and other objects in view, the invention resides in the combination of parts and in the details of construction hereinafter set forth in the following specification and appended claims, certain embodiments thereof being illustrated in the accompanying drawing, which is a view in cross section taken through one form of a self-contained ball bearing unit applied to a shaft shown in side elevation.

Referring more particularly to the drawing, the form of ball bearing unit shown in the drawing includes an inner race ring 1 and an outer race ring 2 provided with suitable spherical grooves to receive a series of ball bearings 3 and maintain them against lateral displacement. Interiorly disposed of the inner ring is a shell 4 that actually engages the shaft 5 and between the shell 4 and the inner race ring are bonded two or more rings 6 of rubber, or comparable resilient material, spaced laterally of each other and from the ends of the bearing unit, the purpose of which is to absorb in compression the shock and vibration which might otherwise be transmitted radially from the shaft to the ball bearings and their races and in shear any shock or vibration which is laterally applied.

Exteriorly of the outer race ring 2 is a shell 7 that has a long flange 8 and a short flange 9 extending radially inwardly. This shell is also slotted to receive a removable centrally apertured disc 10 the retention of which is assisted by the short flange 9. The outer race ring is also formed with an integral centrally located outwardly extending rim 11. Bonded to one side of rim 11 and to the inner side of flange 8 is a rubber ring 12 and to the other side of rim 11 and to the inner side of disc 10 is another rubber ring 13. The outer shell 7 is provided with an inside slot to receive another rubber ring 14 bonded thereto, the ring 14 being preferably slightly spaced from but in alignment with rim 11.

The net result of the construction of this self-contained ball bearing unit is that the rubber rings 6 absorb in compression the shock and vibration from being transmitted radially from the shaft to the bearings and in shear any shock or vibration which is laterally applied. Likewise the rubber ring 14 absorbs in compression any vertically applied shocks or vibrations from being transmitted from the outer shell 7 to the bearings. Moreover, any laterally applied shocks or vibrations are absorbed in compression by rubber rings 12 and 13.

By virtue of the arrangement above described, a complete self-contained inherently shock and vibration absorbing bearing unit, whether of the ball or roller type, has been provided which is secure against any shearing action, and at the same time provides a means for dampening the shocks and vibrations and reducing the noise of the ball or roller bearings.

I claim:

1. A bearing mounting including an inner race and outer race for the bearings, an outer shell for said outer race and an inner shell for said inner race, resilient compression shock absorbing means disposed radially between said inner race and its shell and between said outer race and its shell for absorbing in compression radially applied shocks and vibration and preventing their transfer to said bearings, resilient compression shock absorbing means disposed laterally between one of said races and its shell for absorbing laterally applied shocks and vibrations in shear and preventing their transfer to said bearings.

2. A bearing mounting including an inner race and an outer race for the bearings, an outer shell for said outer race and an inner shell for said inner race, resilient compression shock absorbing means disposed radially between said inner race and its shell and between said outer race and its shell for absorbing in compression radially applied shocks and vibration and preventing their transfer to said bearings, resilient compression shock absorbing means disposed laterally between the outer race and its shell for absorbing laterally applied shocks and vibrations in compression and preventing their transfer to said bearings.

3. A bearing mounting including an inner race and an outer race for the bearings, an outer shell for said outer race and an inner shell for said inner race, resilient compression shock absorbing means disposed radially between said inner race and its shell and between said outer race and its shell for absorbing in compression radially applied shocks and vibration and preventing their transfer to said bearings, resilient compression shock absorbing means disposed laterally between and bonded to one of said races and its shell for absorbing laterally applied shocks and vibrations in compression and preventing their transfer to said bearings.

4. A bearing mounting including an inner race and an outer race for the bearings, an outer shell for said outer race and an inner shell for said inner race, resilient compression shock absorbing means disposed radially between said inner race and its shell and between said outer race and its shell for absorbing in compression respectively radially applied shocks and vibration and preventing their transfer to said bearings, resilient compression shock absorbing means disposed laterally between and bonded to said outer race and its shell for absorbing laterally applied shocks and vibrations in compression and preventing their transfer to said bearings.

5. A bearing mounting including an inner race and an outer race for the bearings, an outer shell for said outer race and an inner shell for said inner race, resilient compression shock absorbing means disposed radially between said inner race and its shell and between said outer race and its shell for absorbing in compression respectively radially applied shocks and vibrations and preventing their transfer to said bearings, one of said races having a radially extending rim between which and its shell is radially disposed a compression shock absorbing member, said last named shell having side elements to the inner surfaces of which and to the two sides of said rim are bonded compression shock absorbing members for absorbing laterally applied shocks and vibrations in compression and preventing their transfer to said bearings.

6. A bearing mounting including an inner race and an outer race for the bearings, an outer shell for said outer race and an inner shell for said inner race, resilient compression shock absorbing means disposed radially between said inner race and its shell and between said outer race and its shell for absorbing in compression respectively radially applied shocks and vibration and preventing their transfer to said bearings, said outer race having a radially extending rim between which and its shell is radially disposed a compression shock absorbing member, said last named shell having side elements to the inner surfaces of which and to the two sides of said rim are bonded compression shock absorbing members for absorbing laterally applied shocks and vibrations in compression and preventing their transfer to said bearings.

HERMAN C. SCHROEDER.